United States Patent
Wang et al.

(10) Patent No.: US 10,759,959 B2
(45) Date of Patent: Sep. 1, 2020

(54) WATERBORNE COMPOSITIONS AND COMPACT PROCESSES OF FORMING MULTI-COMPONENT COMPOSITE COATING COMPOSITIONS ON SUBSTRATES

(71) Applicant: PPG INDUSTRIES OHIO, INC., Cleveland, OH (US)

(72) Inventors: Wei Wang, Allison Park, PA (US); David Fenn, Allison Park, PA (US); Chinming Hui, Pittsburgh, PA (US); Craig Niederst, Valencia, PA (US); Stephen Brian Istivan, Pittsburgh, PA (US); Wenqing Liu, Tianjin (CN); Xiaojie Meng, Tianjin (CN); Liming Song, Tianjin (CN); Juan Wang, Tianjin (CN); Wei Wei, Tianjin (CN); Iei Xie, Tianjin (CN); Hai Rong Huang, Tianjin (CN)

(73) Assignee: PPG Industries Ohio, Inc., Cleveland, OH (US)

( * ) Notice: Subject to any disclaimer, the term of this patent is extended or adjusted under 35 U.S.C. 154(b) by 337 days.

(21) Appl. No.: 15/597,192

(22) Filed: May 17, 2017

(65) Prior Publication Data
US 2017/0335129 A1 Nov. 23, 2017

Related U.S. Application Data

(60) Provisional application No. 62/337,908, filed on May 18, 2016.

(51) Int. Cl.
| C09D 133/08 | (2006.01) |
| C09D 5/00 | (2006.01) |
| C08L 33/08 | (2006.01) |
| B05D 3/02 | (2006.01) |
| B05D 7/00 | (2006.01) |

(52) U.S. Cl.
CPC ......... *C09D 133/08* (2013.01); *B05D 3/0254* (2013.01); *B05D 7/582* (2013.01); *C08L 33/08* (2013.01); *C09D 5/00* (2013.01); *C08L 2203/16* (2013.01); *C08L 2205/02* (2013.01)

(58) Field of Classification Search
None
See application file for complete search history.

(56) References Cited

U.S. PATENT DOCUMENTS

| 6,329,060 B1 * | 12/2001 | Barkac | C08G 18/4615 428/423.1 |
| 6,387,519 B1 | 5/2002 | Anderson et al. | |
| 8,575,259 B2 | 11/2013 | Tomizaki et al. | |
| 2009/0080081 A1 | 3/2009 | Inoeu et al. | |
| 2017/0166706 A1 | 6/2017 | Anderson et al. | |

FOREIGN PATENT DOCUMENTS

| WO | 02/26895 A1 | 4/2002 |
| WO | 2006104664 | 10/2006 |
| WO | 2014097309 | 6/2014 |

* cited by examiner

*Primary Examiner* — Sheeba Ahmed
(74) *Attorney, Agent, or Firm* — Krisanne Shideler

(57) ABSTRACT

The present invention provides waterborne curable film-forming compositions comprising:
  a) an aqueous dispersion of polymeric acrylic particles, wherein the particles have a Z average particle size less than 80 nm and have reactive functional groups; wherein the particles are prepared from a monomer mixture comprising ethylenically unsaturated monomers that are polymerized in the presence of a branched polymer having an acid value of 40-200, wherein the branched polymer is prepared from ethylenically unsaturated monomers;
  b) a crosslinking agent having functional groups reactive with functional groups on the polymeric acrylic particles; and
  c) an aqueous dispersion of at least one additional polymer having hydroxyl and/or acid functional groups and having a Z average particle size greater than 100 nm.
Further provided are multilayer coated substrates comprising the curable film-forming compositions and methods for forming a composite coating on a substrate using the curable film-forming compositions.

22 Claims, 1 Drawing Sheet

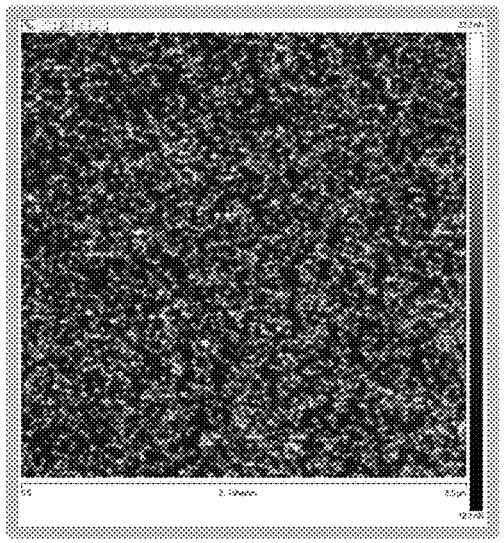 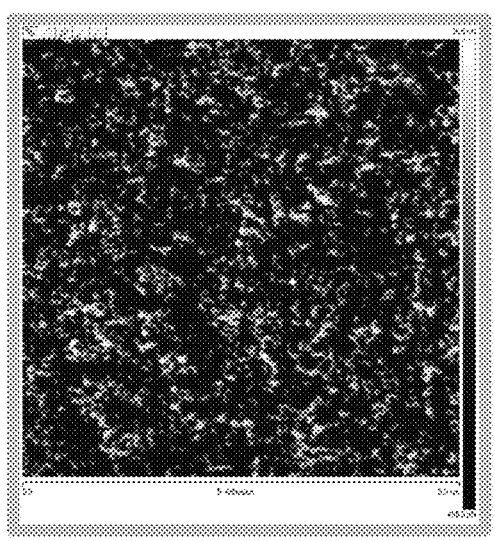
1A (Comparative)  1B

WATERBORNE COMPOSITIONS AND COMPACT PROCESSES OF FORMING MULTI-COMPONENT COMPOSITE COATING COMPOSITIONS ON SUBSTRATES

FIELD OF THE INVENTION

The present invention relates to waterborne curable film-forming compositions, multilayer coated substrates prepared therewith, and methods of forming a composite coating on a substrate.

BACKGROUND OF THE INVENTION

In industrial coating processes such as those used in automotive manufacturing, efforts are constantly made to reduce energy consumption and costs, as well as atmospheric pollution caused by volatile solvents which are emitted during a painting process. However, it is often difficult to achieve high quality, smooth coating finishes with adequate physical properties without applying multiple coating layers, each having their own cure regimen. In addition to achieving near-flawless appearance, automotive coatings must be durable and chip resistant, historically made possible by using multiple coating layers, each serving its own purpose.

The current state of the art automobile painting process involves electrophoretic application of a paint layer to the bare or treated metal substrate followed by fully curing the so-applied layer. A primer layer, whose purpose is primarily to provide chip resistance, UV opacity, and substrate filling (to smooth surface defects) is then applied, followed again by a full curing cycle. A colored basecoat layer is then applied, generally followed by a heated flash and then application of a final clearcoat layer. These two layers are then co-cured to produce the final coated article. There has been a tendency in the last decade to reduce the paint booth footprint, reduce the number of intermediate bake cycles and hence energy expenditure, reduce the number of coating layers and therefore system complexity, while maintaining the high level of optical quality and appearance of the resulting coated vehicles. The general name given to such modified paint processes is Compact Process.

In order to reduce layers, it is usually the primer layer and its associated oven that is eliminated, and the basecoat composition is then typically designed to incorporate some of the primer properties such as chip resistance and substrate filling. In this case the basecoat is typically applied in two layers with the composition of the first layer being modified to incorporate some heretofore primer-associated properties. After application of the two basecoat layers, a heated flash may be employed to remove some of the solvent and is followed by clearcoat application. The multi-component composite coating composition, or "coating stack", is then co-cured to provide the final article. In order to provide desired basecoat opacity and protection of the electrocoat layer, the sum of basecoat layer thicknesses is generally greater than the thickness of a basecoat applied over a fully baked conventional primer.

A similar possibility is known as a 3C1B (3 coat—1 bake) process and involves keeping the primer layer per se, but removing the complete bake after the primer layer. The three layers (primer/basecoat/clearcoat) are applied wet-on-wet-on-wet, with or without heated intermediate flashes between layers, and co-cured in a single cure oven to produce the final article. This process maintains the functionality of the primer layer but removes the cost associated with the primer oven.

In either case the total uncured coating thickness is significantly greater that that found on current state-of-the-art coating systems. In the absence of polymers specifically designed for these Compact Process applications, this higher uncured film thickness can lead to issues like decreased pop and pinhole resistance due to increased solvent content, increased tendency of the coating stack to mud crack, decreased sag resistance, slumping of the basecoat layer, and/or increased interlayer strike-in, which can be manifested by worse optical appearance, poorer color control, and/or poorer process robustness.

Compact Coating systems that provide the desired physical and optical quality over a range of intermediate flash conditions are needed in order to accommodate the different processing parameters of different manufacturers. The system must also be designed to guarantee appearance consistency and quality at different locations on the same vehicle, which may undergo different process conditions during coating. Finally, manufacturers who currently employ heated intermediate flashes are constantly looking to reduce the temperature and time of these steps so they can reduce their energy expense and reduce their line footprint. For these reasons, it is desired to develop resins and coating compositions that provide coating system robustness and coating quality in a Compact Process while reducing process energy requirements.

SUMMARY OF THE INVENTION

The present invention is directed to a waterborne curable film-forming composition comprising:
  a) an aqueous dispersion of polymeric acrylic particles, wherein the particles have a Z average particle size less than 80 nm and have reactive functional groups; wherein the particles are prepared from a monomer mixture comprising ethylenically unsaturated monomers that are polymerized in the presence of a branched polymer having an acid value of 40 to 200, wherein the branched polymer is prepared from ethylenically unsaturated monomers;
  b) a crosslinking agent having functional groups reactive with functional groups on the polymeric acrylic particles; and
  c) an aqueous dispersion of at least one additional polymer having hydroxyl and/or acid functional groups and having a Z average particle size greater than 100 nm.

The present invention is further directed to a multilayer coated substrate comprising:
  A) a substrate;
  B) a primary composition applied directly to a surface of the substrate, forming a first coating;
  C) a first topcoat applied on top of the first coating; and
  D) a second topcoat that is different from the first topcoat applied on top of the first topcoat; wherein the primary composition B) comprises the waterborne curable film-forming composition described above.

The present invention is further directed to a method for forming a composite coating on a substrate. This method is a 3C1B compact process comprising:
  (A) applying a primary composition in the form of the waterborne curable film-forming composition described above to at least a portion of a surface of the substrate to form a substantially uncured primary coating thereon;

(B) applying a first topcoat to at least a portion of the primary coating formed in step (A) prior to substantially curing the primary coating, to form a secondary coating thereon;
(C) applying a second topcoat that is different from the first topcoat to at least a portion of the first topcoat applied in step (B) prior to substantially curing the secondary coating, to form a clear coating thereon; and
(D) holding the substrate at a temperature of 80 to 160° C. for at least 15 minutes, sufficient to substantially cure the composite coating after the primary composition, the first topcoat, and the second topcoat have been applied to the substrate.

BRIEF DESCRIPTION OF THE FIGURES

FIG. 1 illustrates adhesion profiles by atomic force microscopy (AFM) from films prepared as shown in Table 6, of Comparative Mixture 1A (Left) and Mixture 1B (Right). Mixture 1B demonstrates a composition of the present invention containing an aqueous dispersion of polymeric acrylic particles.

DETAILED DESCRIPTION OF THE INVENTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "a" cationic acrylic resin derived from an epoxy functional acrylic resin, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

The polymeric acrylic particles used in the first component a) of the waterborne curable film-forming composition are provided in the form of an aqueous dispersion. Often the aqueous dispersion is essentially free of surfactants, and is prepared in the absence of surfactants. The particles have reactive functional groups such as acid, amine, and/or hydroxyl functional groups. At least a portion of these reactive functional groups can occur on the surface of the particles so that they are available for chemical reaction with other components of the curable film-forming composition. The particles are prepared from a monomer mixture comprising ethylenically unsaturated monomers that are polymerized in the presence of a branched polymer. The branched polymer may become an integral part of the particle by reaction with components of the monomer mixture.

As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents. As used in this specification and the appended claims, the articles "a," "an," and "the" include plural referents, and are used interchangeably with the terms "at least one" and "one or more", unless expressly and unequivocally limited to one referent.

The term "reactive" refers to a functional group capable of undergoing a chemical reaction with itself and/or other functional groups spontaneously or upon the application of heat or in the presence of a catalyst or by any other means known to those skilled in the art.

By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

As used herein, the term "polymer" is meant to refer to prepolymers, oligomers and both homopolymers and copolymers; the prefix "poly" refers to two or more. By "composite material" is meant a combination of two or more differing materials.

Ethylenically unsaturated monomers used to prepare the branched polymer may include monomers such as alkyl esters of acrylic acid or methacrylic acid containing from 1 to 30, and usually 4 to 18 carbon atoms in the alkyl group. Non-limiting examples include methyl (meth)acrylate, ethyl (meth)acrylate, n-butyl (meth)acrylate, isobutyl (meth)acrylate, t-butyl (meth) acrylate, isobornyl (meth)acrylate and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate, isobutylene, and isoprene diisobutylene.

The branched polymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl acrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are used most often. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 8 to 30 carbon atoms, such as butyl glycidyl ether, octyl glycidyl ether, phenyl glycidyl ether and para-(tertiary butyl) phenyl glycidyl ether. Typical glycidyl esters include those of the structure:

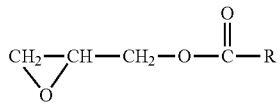

where R is a hydrocarbon radical containing from about 4 to about 26 carbon atoms. Usually, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

The branched polymer typically is acid functional, and any of the acid functional monomers listed above may be included in the reactive mixture used to prepare the branched polymer. The branched polymer often has an acid value of 40-200, such as 60-100 mg KOH/g resin solids. The acid value can be measured according to ASTM D1639 (1996). Acid functionality can also be incorporated into the branched polymer by post-modification after polymerization. For example, alkyl ester groups can be hydrolyzed to generate acid functionality or hydroxyl groups can be reacted with cyclic anhydrides such as phthalic anhydride or hexahydrophthalic anhydride.

Branching of the polymer may be afforded by the inclusion of polyfunctional monomers in the reactive mixture used to prepare the branched polymer. Exemplary polyfunctional monomers comprise at least two ethylenically unsaturated double bonds and include di(meth)acrylates (e.g., hexanediol di(meth)acrylate), ethylene glycol di(meth)acrylate, butanediol di(meth)acrylate, decandediol di(meth)acrylate, allyl (meth)acrylate, or a combination of such monomers. Dienes can be used as branching monomers if the polymerization conditions are such that the branching occurs. Examples of dienes include butadiene, isoprene, 1,3-hepta-diene, methyl-1,3-pentadiene, 2,3-dimethyl-1,3-butadiene, 2-ethyl-1,3-pentadiene,1,3-hexadiene and 2,4-hexadiene. Typically the branched polymer is prepared from a reaction mixture comprising 0.5 to 5 percent by weight of monomers having two or more ethylenically unsaturated functional groups, based on the total weight of monomers used to prepare the branched polymer. Alternatively, the branching can be introduced by using two or more coreactive monomers, such as glycidyl methacrylate and acrylic acid. The branched polymer usually has a Mark-Houwink parameter of 0.3-0.6. The Mark-Houwink relationship between molar mass (M) and intrinsic viscosity ($\eta$) ([$\eta$] $=K.M^\alpha$ provides information about the structure of the polymer. The alpha parameter indicates the degree of branching and can be determined by multi detection size-exclusion chromatography as described by Paillet et al, Journal of Polymer Science Part A: Polymer Chemistry, 2012, 50, 2967-2979, which is incorporated by reference herein.

The branched polymer may contain free ethylenically unsaturated functional groups that may react with monomers in the monomer mixture used to prepare the polymeric acrylic particles. Thus, free ethylenically unsaturated functional groups on the branched polymer enable it to become an integral part of the polymeric acrylic particle. The branched polymer typically contains 0.05 to 0.2 meq free ethylenically unsaturated functional groups/gram branched polymer. The level of ethylenically unsaturated functional groups can be determined using proton-NMR or carbon-13 NMR techniques, as in reference Wang, W., R. A. Hutchinson, "Evidence of Scission Products from Peroxide-initiated Higher Temperature Polymerization of Alkyl Methacrylate" Macromolecules 42, 4910-4913, 2009. Ethylenically unsaturated groups can be introduced into the branched polymer by post modification of the polymer. The unsaturation can be introduced by reacting the acrylic polymer with a compound that comprises both ethylenic unsaturation and another functional group that can react with a functional group on the acrylic polymer. For example, the acrylic polymer can have acid groups, and the compound can comprise a (meth)acrylate group and an oxirane group, so that the oxirane group on the compound would react with the acid group on the acrylic polymer. The reaction conditions can be controlled so that polymerization of the (meth) acrylate groups on the compound would be prevented; suitable controls would be a reduced reaction temperature such as below 110° C., the presence of a free radical inhibitor such as paramethoxyphenol, and the use of an oxygen-rich atmosphere. Under controlled conditions such as these, the (meth)acrylate group on the compound would be retained, and this unsaturation would then be available to react during the preparation of the polymeric particles. Alternatively, the polymerization conditions can be designed to generate a polymer with residual unsaturation. For example, at high temperatures unsaturation can be generated by β-scission reactions as described in Wang, W., R. A. Hutchinson, "A Comprehensive Kinetic Model for High Temperature Free-Radical Production of Styrene/Methacrylate/Acrylate Resins," AIChE J 57, 227-238, 2011. Alternatively monomers with two different types of ethylenically unsaturated groups can be copolymerized under conditions that cause incomplete polymerization of the less reactive unsaturated group, resulting in a branched polymer with residual ethylenically unsaturated groups. For example, allyl methacrylate can be copolymerized under conditions where 10 to 90% of the allyl groups remain unreacted.

The branched polymer is often prepared from a reactive mixture comprising n-butyl (meth)acrylate, (meth)acrylic acid, hydroxyethyl (meth)acrylate, methyl (meth)acrylate, styrene, and allyl (meth)acrylate. For example, a typical branched polymer may be prepared from 28 percent by weight n-butyl acrylate, 25.5 percent by weight butyl methacrylate, 15 percent by weight methyl methacrylate, 10 percent by weight styrene, 10 percent by weight hydroxyethyl methacrylate, 10 percent by weight acrylic acid, and 1.5 percent by weight allyl methacrylate, based on the total weight of monomers used to prepare the branched polymer. Typically the branched polymer has a weight average molecular weight greater than 10,000, such as between 15,000 and 35,000. Number average (Mr) and weight average (Mw) molecular weights as indicated throughout this specification are determined by gel permeation chromatography using polystyrene as standards as is well known to those skilled in the art and such as is discussed in U.S. Pat. No. 4,739,019, at column 4, lines 2-45.

The branched polymer, also called the acrylic stabilizer, can be prepared via organic solution or bulk polymerization techniques. It may be prepared by a solution batch process. For example, the (meth)acrylate monomers can be added over a period of time to a suitable solvent at an elevated temperature, such as at the reflux temperature of the solvent. Suitable solvents include solvents that readily dissolve the branched polymer, such as 2-butoxy ethanol, propylene glycol monomethyl ether, 1-methoxy 2-propanol, 2-ethyl hexanol and n-butanol. A radical initiator, such as a peroxide initiator, is added to the reaction mixture over approximately the same time period. The initiator is chosen so that it will induce radical polymerization of the monomers at the selected reaction temperature. Suitable free radical initiators include peroxy initiators such as benzoyl peroxide, lauroyl peroxide, or tert-butylperoxy-2-ethyl-hexanoate (tert-butylperoctoate) and azo initiators such as 2,2'-azobis(2,4-dimethylpentane nitrile) or 2,2'-azobis(2-methylbutane nitrile). After the monomers and initiator have been added to the reaction mixture, the mixture may be held at the reaction temperature for an extended period of time, during which additional initiator may be added to ensure complete conversion of the monomers. Progress of the reaction may be monitored by solids measurement, or by gas chromatography. In certain embodiments, the acrylic stabilizer can be prepared in a continuous reactor. For example, (meth)acrylate monomers and a radical initiator, such as a peroxide initiator, can be fed continuously through a continuous reactor with a 1 to 20 minute residence time at 150-260° C. Upon at least partial neutralization of the acid groups in the branched polymer with a base the polymers can be dispersed into aqueous medium; i. e., a medium comprising at least 50 percent by weight water. Examples of suitable bases are alkali metal hydroxides and amines. Amines are most often used and suitable amines include ammonia, trimethylamine, dimethyl ethanolamine and diisopropanolamine. Generally any method of producing such polymers that is known to those skilled in the art can be used. The branched polymer often contains less than 15 percent by weight organic solvent when added to the monomer mixture used to prepare the polymeric acrylic particles.

Ethylenically unsaturated monomers present in the monomer mixture used to prepare the polymeric acrylic particles may include monomers such as methyl(meth)acrylate, ethyl (meth)acrylate, n-butyl(meth)acrylate, isobutyl(meth)acrylate, 2-ethylhexyl(meth)acrylate, isobornyl(meth)acrylate, 2-hydroxyethyl(meth)acrylate, 2-hydroxypropyl(meth)acrylate, (meth)acrylic acid, glycidyl(meth)acrylate, styrene, alpha-methylstyrene, lauryl (meth)acrylate, stearyl(meth) acrylate, itaconic acid and its esters, and the like. The monomer mixture usually comprises at least 20 percent by weight styrene, often at least 25 percent by weight or at least 40 percent by weight styrene, based on the total weight of monomers in the monomer mixture. The composition of the monomer mixture is such that the monomer mixture yields a polymer having a calculated Fox $T_g$ of at least 40° C., such as at least 60° C. or at least 80° C. Fox $T_g$ can be calculated according to T. G. Fox, Bull. Am. Phys. Soc. (Ser. II) 1, 123 (1956) and J. Brandrup, E. H. Immergut, Polymer Handbook 3rd edition, John Wiley, New York, 1989. Also, the monomer mixture comprises less than 10 percent by weight, usually less than 5 percent by weight, or less than 2 percent by weight, or even less than 0.5 percent by weight based on the total weight of monomers in the monomer mixture, of polyfunctional monomers such as polyacrylates or acid functional ethylenically unsaturated monomers (i. e., co-reactive monomers) that would allow for internal crosslinking within the polymeric acrylic particles.

The polymeric acrylic particles are typically formed by emulsion polymerization of the monomer mixture in the presence of the branched polymer in an aqueous medium. Exemplary polymerization methods include addition of the branched polymer to a suitable reactor with water and amine, followed by addition of the monomer mixture and appropriate initiators. Suitable initiators include peroxides such as hydrogen peroxide and tertiary butyl hydroperoxide, persulfates such as potassium persulfate and ammonium persulfate, and redox initiator combinations such as ascorbic acid and hydrogen peroxide. The mixture may be held at elevated temperatures, such as 40 to 90° C., until polymerization is complete. The weight ratio of branched polymer to ethylenically unsaturated monomers in the monomer mixture is usually from 20:80 to 40:60, such as 30:70 or even 50:50. The branched polymer may be designed to be more polar than the polymer formed from the monomer mixture to allow for dispersion of the polymeric particles in an aqueous medium.

The dispersion of polymeric acrylic particles may be prepared in the absence of any surfactants, although surfactants may be added later to the curable film-forming composition during preparation. It is notable that the polymeric acrylic particles do not typically form a film at ambient temperature in the absence of solvent.

The polymeric acrylic particles used in the compositions of the present invention typically have a Z average particle size of 10 to 80 nm, often less than 80 nm, such as 30 to 60 nm, such that they would be considered nanoparticles. Particle size may be determined from among the numerous techniques known in the art, such as the method described below. The particle size is measured with a Malvern Zetasizer, which is a high performance two angle particle size analyzer for the enhanced detection of aggregates and measurement of small or dilute samples, and samples at very low or high concentration using dynamic light scattering. Typical applications of dynamic light scattering are the characterization of particles, emulsions or molecules, which have been dispersed or dissolved in a liquid. The Brownian motion of particles or molecules in suspension causes laser light to be scattered at different intensities. Analysis of these intensity fluctuations yields the velocity of the Brownian motion and hence the particle size using the Stokes-Einstein relationship. The reported particle sizes for all examples are the Z average mean value.

The polymeric acrylic particles in the first component a) are present in the waterborne curable film-forming composition in amounts of at least 2 percent by weight, such as at least 7 percent by weight or at least 9 percent by weight, and in amounts of at most 25 percent by weight, such as at most 12 percent by weight or at most 10 percent by weight, based on the total weight of resin solids in the curable film-forming composition.

As used herein "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

The waterborne curable film-forming compositions of the present invention further comprise b) a crosslinking agent having functional groups reactive with functional groups on the polymeric acrylic particles. Suitable curing agents b) for use in the curable film-forming compositions of the present invention include at least partially alkylated aminoplasts, including fully alkylated aminoplasts (for example, at least partially alkylated aminoplast resins with amino functional groups making up less than 10 mol % of the total functional groups), high imino aminoplasts (i. e., imino functional aminoplasts comprising at least 15 mol percent imino functional groups), polyisocyanates, including blocked isocyanates, polyepoxides, beta-hydroxyalkylamides, polyacids, dihydrazides, carbodiimides, polyols and mixtures of any of the foregoing, and include those known in the art for any of these materials.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®.

Often the crosslinking agent comprises an at least partially alkylated aminoplast resin and optionally an imino functional aminoplast comprising at least 15 mol percent imino functional groups (i. e., a "high imino" aminoplast), wherein the mass ratio of at least partially alkylated aminoplast resin to imino functional aminoplast is 100:0 to 10:90. The at least partially alkylated aminoplast resin provides improved appearance properties while the high imino aminoplast contributes to faster film cure speeds and higher cured film hardness, compared to film-forming compositions that do not contain these aminoplasts.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

Beta-hydroxyalkylamides are suitable curing agents for polymers having carboxylic acid groups. The beta-hydroxyalkylamides can be depicted structurally as follows:

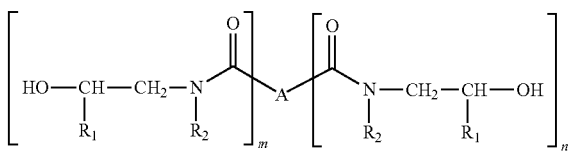

wherein $R_1$ is H or $C_1$ to $C_5$ alkyl; $R_2$ is H, $C_1$ to $C_5$ alkyl, or:

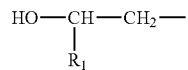

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Suitable polyacids and polyols useful as curing agents include any of those known in the art, such as those described herein for the making of polyesters.

Examples of dihydrazides are maleic dihydrazide, fumaric dihydrazide, itaconic dihydrazide, phthalic dihydrazide, isophthalic dihydrazide, terephthalic dihydrazide, oxalic dihydrazide, adipic dihydrazide and sebacic dihydrazide.

Suitable carbodiimide crosslinkers include an aliphatic and/or cycloaliphatic dinitrogen analogue of carbonic acid of the generalized structure: $RN=C=NR_1$ where R and $R_1$ are independently aliphatic or cycloaliphatic groups. The aliphatic groups can comprise 1-6 carbon atoms. Examples include dibutyl carbodiimide and dicyclohexyl carbodiimide. Oligomeric or polymeric carbodiimide crosslinkers can also be used. Examples of such materials are disclosed in US 2009/0246393A1. Aliphatic carbodiimides are particularly useful when the waterborne coating composition is used as a monocoat.

The preparation of water dispersible carbodiimide crosslinkers is well known in the art. Suitable water dispersible carbodiimide crosslinkers can be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure.

Suitable water dispersible carbodiimides are commercially available. For example, UCARLINK XL-29SE, XL-20 is commercially available from Union Carbide and CARBODILITE VO2-L2 is commercially available from Nisshinbo Industries, Inc.

Appropriate mixtures of crosslinking agents may also be used in the invention. The amount of the crosslinking agent used in the curable film-forming composition generally ranges from 5 to 65 percent by weight based on the total weight of resin solids in the curable film-forming composition. For example, the minimum amount of crosslinking agent may be at least 5 percent by weight, often at least 10 percent by weight and more often, at least 15 percent by weight. The maximum amount of crosslinking agent may be 65 percent by weight, more often 50 percent by weight, or 40 percent by weight. Ranges of crosslinking agent may include, for example, 5 to 50 percent by weight, 5 to 60 percent by weight, 10 to 50 percent by weight, 10 to 60 percent by weight, 10 to 65 percent by weight, 15 to 40 percent by weight, 15 to 50 percent by weight, and 15 to 65 percent by weight.

The waterborne curable film-forming compositions of the present invention further comprise c) an aqueous dispersion of at least one additional polymer having functional groups capable of reacting with functional groups on the crosslinking agent b) and having an average particle size greater than 100 nm, measured as noted above. The aqueous dispersion c) may be used as a grind vehicle for pigment in the waterborne curable film-forming composition. At least a portion (less than 100 percent) of the aqueous dispersion c) may be used as a grind vehicle, or up to 100 percent (i. e., up to its entirety). Likewise, as with the polymeric acrylic particles in component a), some or all of the additional polymer in the component c) does not typically form a film at ambient temperature in the absence of solvent.

The additional polymer has functional groups that are reactive with the crosslinking agent, including acid and/or hydroxyl groups as noted above. The additional polymer may be selected from at least one of acrylic polymers, polyesters, polyurethanes, polyurea, polyamides, polycarbonates, polyolefins, and polyethers. The polymer may also be a graft copolymer of different types of polymers, such as an acrylic polymer grafted to a polyester or polyurethane polymer. Generally these polymers can be any polymers of these types made by any method known to those skilled in the art where the polymers are water dispersible, emulsifiable, or of limited water solubility. Other functional groups may be selected from at least one of amine groups, epoxide groups, thiol groups, carbamate groups, amide groups, urea groups, and mercaptan groups.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Hydroxyl functional groups are often incorporated into the acrylic polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylam ides and N-(alkoxymethyl) methacrylamides.

Beta-hydroxy ester functional monomers can be prepared as noted above.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the additional polymer in the aqueous dispersion c) may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4, 4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, and urea may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the additional polymer. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, and urea may be incorporated into the polyurethane as desired using suitably functional reactants if available, or conversion reactions as necessary to yield the desired functional groups. Such techniques are known to those skilled in the art.

Polyurea may be prepared by reacting any of the polyisocyanates described above with a polyamine.

Examples of polyether polyols are polyalkylene ether polyols which include those having the following structural formula:

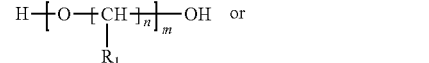
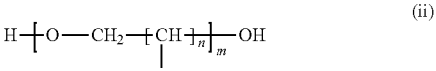

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

Suitable epoxy functional polymers for use as additional polymer may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis (hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

Epoxy functional film-forming resins may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

The additional polymer may be dispersed in an aqueous medium using conventional techniques known in the art.

The waterborne curable film-forming compositions may additionally contain pigments. Suitable pigments for use in the aqueous dispersion c) include any organic and/or inorganic pigments typically used in primer or sealer compositions. Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably. Pigments may alternatively or additionally be added separately to the waterborne curable film-forming composition.

The waterborne curable film-forming compositions used in the present invention may further contain adjunct ingredients conventionally used in coating compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

The waterborne curable film-forming compositions of the present invention usually have a total solids content of at least 35 percent by weight, such as at least 40, and a VOC up to 2.1 lb/gal.

The additional polymer in component c) is present in the waterborne curable film-forming composition in amounts of at least 10 percent by weight, such as at least 20 percent by weight or at least 50 percent by weight, and in amounts of at most 70 percent by weight, such as at most 65 percent by weight or at most 60 percent by weight, based on the total weight of resin solids in the curable film-forming composition. A range of 50 to 70 percent by weight is typical.

The waterborne curable film-forming compositions of the present invention typically comprise less than 20 percent by weight of any polymeric component having a number average molecular weight less than 2000, excluding the crosslinking agent (b). Often they are essentially free of any polymeric component having a number average molecular weight less than 2000. Number average molecular weight can be determined by gel permeation chromatography using polystyrene as standards as is well known to those skilled in the art and such as is discussed in U.S. Pat. No. 4,739,019, at column 4, lines 2-45. It is believed that after application of the waterborne curable film-forming composition of the present invention to a substrate and after dehydration to form a dehydrated coating, the dehydrated coating demonstrates a concentration of the polymeric acrylic particles originally present in the aqueous dispersion a) within a surface region of the coating that is greater than a concentration of the polymeric acrylic particles within a bulk region of the coating. The polymeric acrylic particles, which are smaller than the particles of additional polymer in the composition, are believed to migrate to the surface of the coating. This allows for an improved smoothness of the coated substrate and hence an improved appearance, compared to substrates coated with a composition that does not contain the polymeric acrylic particles. It is further believed that the presence of polymeric components having a number average molecular weight less than 2000 may impede migration of the polymeric acrylic particles to the surface of the coating.

The surface region of the coating may be understood as a region extending from the exposed air-surface interface to a coating depth of 100 nanometers.

The concentration of particles in the dehydrated composition can be characterized in a variety of ways. For example the average number density of particles (i.e., the average number or population of particles per unit volume) in the surface region is greater than the average number density in the bulk region. Alternatively, the average volume fraction (i.e., volume occupied by particles/total volume) or average weight percent per unit volume, i.e., ((the weight of particles within a unit volume of dehydrated coating)/(total weight of the unit volume of dehydrated coating))×100% of the particles in the surface region is greater than the average volume fraction or average weight percent of particles within the bulk region.

The concentration of particles (as characterized above) present in the surface region of the dehydrated coating can be determined, if desired, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy.

For example, the concentration of particles present in the surface region of the dehydrated coating may be determined by cross-sectional transmission electron microscopy techniques. A useful transmission electron microscopy method is described generally as follows. A coating composition is applied to a substrate and dehydrated under conditions appropriate to the composition and substrate. Samples of the dehydrated coating are then removed or delaminated from the substrate and embedded in a cured epoxy resin using techniques as are well known in the art. The embedded samples then can be microtomed at room temperature using techniques well known in the art, such as by forming a block face. The sections can be cut using a 45° diamond knife edge mounted in a holder with a "boat cavity" to hold water. During the cutting process, sections float to the surface of the water in the boat cavity. Once a few cuts reach an interference color of bright to dark gold (i.e., approximately 100 to 150 nanometers thickness), individual samples typically are collected onto a formvar-carbon coated grid and dried at ambient temperature on a glass slide. The samples are then placed in a suitable transmission electron microscope, such as a Philips CM12 TEM, and examined at various magnifications, such as at 105,000× magnification, for documentation of particle concentration at the surface region, via electron micrography. The concentration of particles in a surface region of a dehydrated coating can be ascertained upon visual inspection of the electron micrograph.

The multilayer coated substrates of the present invention comprise:
  A) a substrate;
  B) a primary composition applied directly to a surface of the substrate, forming a first coating;
  C) a first topcoat applied on top of the first coating; and
  D) a second topcoat that is different from the first topcoat applied on top of the first topcoat. The primary composition B) comprises the waterborne curable film-forming composition of the present invention described above.

The multilayer coated substrates described above may be prepared using a method for forming a composite coating on a substrate in accordance with the present invention, comprising:
  (A) applying a primary composition in the form of a waterborne curable film-forming composition to at least a portion of a surface of the substrate to form a substantially uncured primary coating thereon, the waterborne curable film-forming composition comprising any of those described above;

(B) applying a first topcoat to at least a portion of the primary coating formed in step (A) prior to substantially curing the primary coating, to form a secondary coating thereon;

(C) applying a second topcoat that is different from the first topcoat to at least a portion of the first topcoat applied in step (B) prior to substantially curing the secondary coating, to form a clear coating thereon; and (D) holding the substrate at a temperature of 80 to 160° C. for at least 15 minutes, sufficient to substantially cure the composite coating after all coating layers have been applied to the substrate.

Non-metallic substrates A) include wood, polymeric, plastic, polyester, polyolefin, polyamide, cellulosic, polystyrene, polyacrylic, poly(ethylene naphthalate), polypropylene, polyethylene, nylon, EVOH, poly(lactic acid), other "green" polymeric substrates, poly(ethylene terephthalate) ("PET"), polycarbonate, polycarbonate acrylonitrile butadiene styrene ("PC/ABS"), polyamide, polymer composites and the like. Car parts typically formed from thermoplastic and thermoset materials include bumpers and trim.

The metal substrates used in the present invention include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy,) and/or zinc-iron alloys. Also, aluminum (such as beverage cans), aluminum alloys, zinc-aluminum alloys such as GALFAN, GALVALUME, aluminum plated steel and aluminum alloy plated steel substrates may be used, as well as magnesium metal, titanium metal, and alloys thereof. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below.

The substrate may alternatively comprise more than one metal or metal alloy in that the substrate may be a combination of two or more metal substrates assembled together such as hot-dipped galvanized steel assembled with aluminum substrates. The substrate may alternatively comprise a composite material such as a fiberglass composite. It is desirable to have a coating system which can be applied to both metal and non-metal parts. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the substrate can be in the form of a sheet, plate, bar, rod or any shape desired, but it is usually in the form of an automobile part, such as a body, door, fender, hood or bumper. The thickness of the substrate can vary as desired.

The substrates to be used may be bare substrates. By "bare" is meant a virgin substrate that has not been treated with (or has been stripped of) any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrates suitable for use in the preparation of the multilayer coated substrates of the present invention may further comprise an electrodeposited coating deposited upon the surface of the substrate prior to applying the primary composition. The primary composition is then applied directly onto the electrodeposited coating. Such coated substrates demonstrate an initial $R_a$ value of 0.3 to 0.4, such as 0.3 to 0.35. $R_a$ represents arithmetical mean surface roughness, and may be measured using a profilometer available from Mitutoyo America Corporation, according to the manufacturer's instructions, with 2.5 cutoff wavelength.

Before depositing any coating compositions upon the surface of the substrate, it is common practice, though not necessary, to remove foreign matter or previously applied paints such as OEM coatings from the surface by thoroughly stripping, cleaning and degreasing the surface. When the substrate is not an existing vehicle part, such cleaning typically takes place after forming the substrate (stamping, welding, etc.) into an end-use shape. The surface of the substrate can be cleaned by physical or chemical means, or both, such as mechanically abrading the surface (e. g., sanding) or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

In an OEM setting, a metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the Handbook of Chemistry and Physics, 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

The multi-layer coated substrates of the present invention further comprises B) a primary composition applied directly to a surface of the substrate, forming a first coating; C) a first topcoat applied on top of the first coating; and D) a second topcoat that is different from the first topcoat applied on top of the first topcoat.

Each coating composition (primary, first topcoat, etc.) may be applied by known application techniques, such as dipping or immersion, spraying, intermittent spraying, dipping followed by spraying, spraying followed by dipping, brushing, electrodeposition, or by roll-coating. Usual spray techniques and equipment for air spraying and electrostatic spraying, either manual or automatic methods, can be used.

After application of the primary composition, light sanding of the composition may be performed, though it is often not necessary, and the first and second topcoat compositions may subsequently be applied in accordance with the method of the present invention. A topcoat provides, inter alia, aesthetic properties such as color to the substrate.

In step (B) of the method of the present invention, the first topcoat is applied to at least a portion of a surface of the primary composition in a wet-on-wet application without substantially curing the primary composition to form a substantially uncured secondary coating, composed of the primary composition and first topcoat thereon. The first topcoat can be applied to the surface of the primary composition by any of the coating processes noted above.

Usually, the first topcoat is present as a basecoat which includes a film-forming material or binder and pigment. The first topcoat can be a waterborne coating, solventborne coating or powder coating, as desired, but is usually a waterborne coating. Usually the first topcoat is a crosslinkable coating comprising at least one thermosettable film-forming material and at least one crosslinking material, although thermoplastic film-forming materials such as polyolefins can be used.

Suitable resinous binders for organic solvent-based base coats are disclosed in U.S. Pat. No. 4,220,679 at column 2, line 24 through column 4, line 40 and U.S. Pat. No. 5,196,485 at column 11, line 7 through column 13, line 22. Suitable waterborne base coats for color-plus-clear composites are disclosed in U.S. Pat. No. 4,403,003 and the resinous compositions used in preparing those base coats can be used in the present invention. Also, waterborne polyurethanes such as those prepared in accordance with U.S. Pat. No. 4,147,679 can be used as the resinous binder in the basecoat. Further, waterborne coatings such as those described in U.S. Pat. No. 5,071,904 can be used as the basecoat. Each of the patents discussed above is incorporated by reference herein. Other useful film-forming materials for the first topcoat include the hydrophobic polymers and/or reaction product (a) discussed above. Other components of the first topcoat can include crosslinking materials and additional ingredients such as pigments discussed above. Useful metallic pigments include aluminum flake, bronze flakes, coated mica, nickel flakes, tin flakes, silver flakes, copper flakes and combinations thereof. Other suitable pigments include mica, iron oxides, lead oxides, carbon black, titanium dioxide and talc. The specific pigment to binder ratio can vary widely so long as it provides the requisite hiding at the desired film thickness and application solids.

The solids content of the first topcoat generally ranges from about 15 to about 60 weight percent, and usually about 20 to about 50 weight percent.

The amount of the first topcoat applied to the substrate can vary based upon such factors as the type of substrate and intended use of the substrate, i.e., the environment in which the substrate is to be placed and the nature of the contacting materials.

During application of the first topcoat to the substrate, ambient relative humidity generally can range from about 30 to about 80 percent, usually about 50 percent to 70 percent.

A substantially uncured secondary coating comprising the first topcoat and primary composition is formed on the surface of the substrate during application of the first topcoat to the primary composition. Typically, the coating thickness after curing of the substrate having the multilayered composite coating thereon ranges from about 0.4 to about 2.0 mils (about 10 to about 50 micrometers), and usually about 0.5 to about 1.6 mils (about 12 to about 40 micrometers). Some migration of coating materials between the coating layers, usually less than about 20 weight percent, can occur.

As used herein, "substantially uncured secondary coating" means that the first topcoat, after application to the surface of the substrate, and primary composition form a secondary coating or film which is substantially uncrosslinked, i.e., is not heated to a temperature sufficient to induce significant crosslinking and there is substantially no chemical reaction between the reactive components of the primary composition.

After application of a composition, a film is formed by driving solvent, i.e., organic solvent and water, out of the film by heating or by an air-drying period (dehydration). Suitable drying conditions will depend on the particular composition and/or application, but in some instances a dehydration time of from about 5 to 30 minutes at a temperature of 60° C. to 80° C. will be sufficient. The primary composition used in the method of the present invention is typically dehydrated for at least 10 minutes, such as 10-30 minutes or 15-20 minutes. Dehydration of the primary coating may take place under ambient conditions or at an elevated temperature such as at 60 to 80° C. before application of the first topcoat. The first topcoat is likewise typically dehydrated for up to 30 minutes at 60 to 80° C. before application of the second topcoat. The heating is usually only for a short period of time sufficient to ensure that a second topcoat can be applied over the secondary coating essentially without dissolving the secondary coating. Suitable drying conditions depend on the components of the first topcoat and on the ambient humidity, but generally the drying conditions are similar to those discussed above with respect to the primary composition. Also, multiple first topcoats can be applied to develop the optimum appearance. Usually between coats, the previously applied coat is flashed; that is, exposed to ambient conditions for about 1 to 20 minutes.

In step (C) of the method of the present invention, a second topcoat, usually a clear coating composition, is then applied to at least a portion of the secondary coating without substantially curing the secondary coating to form a substantially uncured composite coating thereon. If the second topcoat is waterborne or solventborne, then it is applied in a wet-on-wet application. The second topcoat can be applied to the surface of the secondary coating by any of the coating processes discussed above for applying the primary composition. The second topcoat can be a waterborne coating, solventborne coating or powder coating, as desired, but is usually a solventborne coating. Typically the second topcoat is a crosslinkable coating comprising at least one thermosettable film-forming material and at least one crosslinking material, although thermoplastic film-forming materials such as polyolefins can be used. The second topcoat is often essentially free of pigments; i. e., a clearcoat. Any of the transparent or clear coating compositions known in the art are suitable for this purpose. Suitable waterborne clearcoats are disclosed in U.S. Pat. No. 5,098,947 (incorporated by reference herein) and are based on water soluble acrylic resins. Useful solvent borne clearcoats are disclosed in U.S. Pat. Nos. 5,196,485 and 5,814,410 (incorporated by reference herein) and include polyepoxides and polyacid curing agents. Specific examples include those available under the tradenames DIAMOND COAT® and NCT®, all commercially available from PPG. Crosslinkable coatings comprising at least one polymeric polyol such as an acrylic polyol, and at least one crosslinking agent such as an aminoplast, are also suitable. Suitable powder clearcoats are described in U.S. Pat. No. 5,663,240 (incorporated by reference herein) and include epoxy functional acrylic copolymers and polycarboxylic acid crosslinking agents. The clear coating composition can include crosslinking materials and additional ingredients such as are discussed above but not pigments. Usually the clear coating composition is chemically different or contains different relative amounts of ingredients from the first topcoat, although the clear coating composition can be the same as the first topcoat but without the pigments. Other examples include the clear coating compositions described in U.S. Pat. Nos. 4,650,718; 5,814,410; 5,891,981; and WO 98/14379.

The amount of the second topcoat applied to the substrate can vary based upon such factors as the type of substrate and intended use of the substrate, i.e., the environment in which the substrate is to be placed and the nature of the contacting materials.

During application of the second topcoat to the substrate, ambient relative humidity generally can range from about 30 to about 80 percent, usually about 50 percent to 70 percent.

A substantially uncured composite coating of the second topcoat and secondary coating (which includes the primary composition) is formed on the surface of the substrate during application of the second topcoat to the secondary coating. Typically, the coating thickness after curing of the multilayered composite coating on the substrate ranges from about 0.5 to about 4 mils (about 15 to about 100 micrometers), and usually about 1.2 to about 3 mils (about 30 to about 75 micrometers).

As used herein, "substantially uncured composite coating" means that the second topcoat, after application to the surface of the substrate, and secondary coating form a composite coating or film which is substantially uncrosslinked, i.e., is not heated to a temperature sufficient to induce significant crosslinking and there is substantially no chemical reaction between the thermosettable dispersion and the crosslinking material.

After application of the second topcoat, the coated substrate is subjected to conditions sufficient to substantially cure the composite coating; e. g., a temperature of 80 to 160° C. for at least 15 minutes, sufficient to substantially cure each layer of the composite coating simultaneously after all coating layers have been applied to the substrate.

The method of the present invention may further comprise an initial step of forming an electrodeposited coating upon the surface of the substrate prior to applying the primary composition in step (A). The primary composition is then applied directly onto the electrodeposited coating.

The method of the present invention is surprisingly suitable for use in an existing solventborne automotive OEM production line without requiring rebuilding or modification of the line. In a conventional B1B2 compact coating process, dehydration of the first basecoat layer takes place for up to five minutes at ambient temperatures. Longer times have been shown to detrimentally affect the coating appearance. In a conventional 3C1B compact coating process, dehydration of the first layer takes place during baking for 5 minutes at 80° C. In a conventional solventborne production line, there is a primer bake. When the primer bake is removed as in a compact process, it takes 16 minutes to move a coated article along the in situ production line to next step, which is application of the basecoat. This 16-minute interval is too long for a conventional waterborne B1B2 composition because it detrimentally affects the coating appearance. However, the method of the present invention, using the waterborne compositions described herein, can be used in an existing solventborne production line because the coating compositions used in the method of the present invention can withstand the longer time intervals without loss of appearance.

The multilayer coated substrates of the present invention demonstrate certain desirable aesthetic properties. For example, upon application of each coating layer to a vertically oriented substrate having an initial $R_a$ value of 0.3 to 0.4, such as 0.3 to 0.35, and upon curing of the primary composition, the first topcoat, and the second topcoat in a vertical orientation, the multilayer coated substrate demonstrates a longwave value of no more than 10. $R_a$ values may be determined using a profilometer available from Mitutoyo America Corporation, according to the manufacturer's instructions, with 2.5 cutoff wavelength.

Surface waviness is an indication of the roughness of a surface, and may be measured using a wave scan instrument such as the BYK Wavescan Plus available from BYK-Gardner USA, which measures surface topography via an optical profile. The wave scan instrument uses a point source (i.e. laser) to illuminate the surface over a predetermined distance, for example 10 centimeters, at an angle of incidence of 60°. The reflected light is measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. The surface "waviness" is differentiated into longterm and shortterm waviness ("longwave" and "shortwave") to simulate visual evaluation by the human eye. Data are divided into longwave (structure size>0.6 mm) and shortwave (structure size<0.6 mm) signals using a mathematical filter function. Each range in value from 0 to 50. Longterm waviness represents the variance of the longwave signal amplitude, while the shortterm waviness represents variance of the shortwave signal amplitude. The long- and shortterm waviness of a coating surface can give an indirect measure of topography-influencing factors such as substrate roughness, and flow and leveling properties of coatings. Longwave values may be determined using a BYK Wavescan Plus instrument in accordance with the manufacturer's suggested method of operation. Longwave values of lesser magnitude are indicative of coatings that are smoother in appearance.

Each of the characteristics and examples described above, and combinations thereof, may be said to be encompassed by the present invention. The present invention is thus drawn to the following nonlimiting aspects:

1. A waterborne curable film-forming composition comprising:
   a) an aqueous dispersion of polymeric acrylic particles, wherein the particles have a Z average particle size less than 80 nm as measured using dynamic light scattering and have reactive functional groups; wherein the particles are prepared from a monomer mixture comprising ethylenically unsaturated monomers that are polymerized in the presence of a branched polymer having an acid value of 40-200, wherein the branched polymer is prepared from ethylenically unsaturated monomers;
   b) a crosslinking agent having functional groups reactive with functional groups on the polymeric acrylic particles; and
   c) an aqueous dispersion of at least one additional polymer having hydroxyl and/or acid functional groups and having a Z average particle size greater than 100 nm as measured using dynamic light scattering.
2. The waterborne curable film-forming composition according to aspect 1, wherein the polymeric acrylic particles have free acid and/or hydroxyl functional groups.
3. The waterborne curable film-forming composition according to any of aspects 1 to 2, wherein the branched polymer contains free ethylenically unsaturated functional groups that may react with monomers in the monomer mixture.
4. The waterborne curable film-forming composition according to any of aspects 1 to 3, wherein the weight ratio of branched polymer to ethylenically unsaturated monomers in the monomer mixture is from 20:80 to 40:60.
5. The waterborne curable film-forming composition according to any of aspects 1 to 4, wherein the composition comprises less than 20 percent by weight of any polymeric component having a number average molecular weight less than 2000, excluding the crosslinking agent (b).
6. The waterborne curable film-forming composition according to any of aspects 1 to 5, wherein the composition is essentially free of any polymeric component having a number average molecular weight less than 2000, excluding the crosslinking agent (b).
7. The waterborne curable film-forming composition according to any of aspects 1 to 6, wherein the monomer mixture comprises at least 20 percent by weight styrene, based on the total weight of monomers in the monomer mixture.
8. The waterborne curable film-forming composition according to any of aspects 1 to 7, wherein the monomer mixture yields a polymer having a calculated $T_g$ of at least 40° C.
9. The waterborne curable film-forming composition according to any of aspects 1 to 8, wherein the monomer mixture comprises less than 5 percent by weight of polyfunctional monomers that would allow for internal crosslinking within the polymeric acrylic particles, based on the total weight of monomers in the monomer mixture.
10. The waterborne curable film-forming composition according to any of aspects 1 to 9, wherein the branched polymer is prepared from a reaction mixture comprising 0.5 to 5 percent by weight of monomers having two or more ethylenically unsaturated functional groups, based on the total weight of monomers used to prepare the branched polymer.
11. The waterborne curable film-forming composition according to any of aspects 1 to 10, wherein the branched polymer has a Mark-Houwink parameter of 0.3-0.6.
12. The waterborne curable film-forming composition according to any of aspects 1 to 11, wherein the polymeric acrylic particles are present in the film-forming composition in an amount ranging from 2 weight percent to 25 weight percent, based on the total weight of the resin solids of the components which form the curable film-forming composition.
13. The waterborne curable film-forming composition according to any of aspects 1 to 12, wherein the polymeric acrylic particles are present in the film-forming composition in an amount ranging from 7 weight percent to 12 weight percent, based on the total weight of the resin solids of the components which form the curable film-forming composition.
14. The waterborne curable film-forming composition according to any of aspects 1 to 13, wherein the crosslinking agent comprises an at least partially alkylated aminoplast resin and/or a polyisocyanate.
15. The waterborne curable film-forming composition according to any of aspects 1 to 14, wherein the crosslinking agent comprises an at least partially alkylated aminoplast resin and optionally an imino functional aminoplast comprising at least 15 mol percent imino functional groups, wherein the mass ratio of at least partially alkylated aminoplast resin to imino functional aminoplast is 100:0 to 10:90.
16. The waterborne curable film-forming composition according to any of aspects 1 to 15, wherein the crosslinking agent is present in the film-forming composition in an amount ranging from 2 weight percent to 65 weight percent (15 to 40 in specification) based on total weight of the resin solids of the components which form the curable film-forming composition.
17. The waterborne curable film-forming composition according to any of aspects 1 to 16, wherein the additional polymer c) comprises a polyurethane, polyester, polyether, polycarbonate, polyurea, polyolefin and/or acrylic polymer, and is present in the composition is an amount of 50 to 70 percent by weight, based on the total weight of resin solids in the curable film-forming composition.
18. The waterborne curable film-forming composition according to any of aspects 1 to 17, wherein after application of the composition to a substrate and after dehydration to form a dehydrated coating, the dehydrated coating demonstrates a concentration of the polymeric acrylic particles within a surface region of the coating that is greater than a concentration of the polymeric acrylic particles within a bulk region of the coating.
19. A multilayer coated substrate comprising:
   A) a substrate;
   B) a primary composition applied directly to a surface of the substrate, forming a first coating;
   C) a first topcoat applied on top of the first coating; and D) a second topcoat that is different from the first topcoat applied on top of the first topcoat; wherein the primary composition B) comprises a waterborne curable film-forming composition according to any of aspects 1 to 18.

20. The multilayer coated substrate according to aspect 19, wherein upon application to a vertically oriented substrate having an initial $R_a$ value of 0.3 to 0.4 and upon curing of the primary composition, the first topcoat, and the second topcoat in a vertical orientation, the multilayer coated substrate demonstrates a long-wave value of no more than 10.

21. The multilayer coated substrate according to any of aspects 19 to 20, wherein the primary composition B) contains pigment.

22. The multilayer coated substrate according to any of aspects 19 to 21, wherein the first topcoat C) comprises a pigmented or otherwise colored basecoat.

23. The multilayer coated substrate according to any of aspects 19 to 22, wherein the second topcoat D) comprises a transparent coating composition.

24. A method for forming a composite coating on a substrate comprising:

(A) applying a primary composition in the form of a waterborne curable film-forming composition to at least a portion of a surface of the substrate to form a substantially uncured primary coating thereon, the waterborne curable film-forming composition comprising any of those according to aspects 1 to 18;

(B) applying a first topcoat to at least a portion of the primary coating formed in step (A) prior to substantially curing the primary coating, to form a secondary coating thereon;

(C) applying a second topcoat that is different from the first topcoat to at least a portion of the first topcoat applied in step (B) prior to substantially curing the secondary coating, to form a clear coating thereon; and (D) holding the substrate at a temperature of 80 to 160° C. for at least 15 minutes, sufficient to substantially cure the composite coating after all coating layers have been applied to the substrate.

25. The method according to aspect 24, further comprising an initial step of forming an electrodeposited coating upon the surface of the substrate prior to applying the primary composition in step (A), wherein the primary composition is applied directly onto the electrodeposited coating.

26. The method according to any of aspects 24 to 25, wherein prior to applying the first topcoat to the primary coating, the primary coating is dehydrated.

The following examples are intended to illustrate variations of the invention, and should not be construed as limiting the invention in any way. Unless otherwise indicated, all parts are by weight.

EXAMPLES

Example 1

An acrylic copolymer was prepared in a continuous process as follows:

TABLE 1

| Ingredients | Parts by Weight |
|---|---|
| Charge #1 | |
| Butyl Acrylate | 756 |
| Lauryl Methacrylate | 688.50 |
| Methyl Methacrylate | 405 |
| Styrene | 270 |
| Hydroxyethyl Methacrylate | 270 |
| Acrylic Acid | 270 |
| Allyl Methacrylate | 40.5 |
| Dowano PM | 135 |
| Di-tert-butyl peroxide | 54 |
| Charge #2 | |
| Dimethyl ethanol amine | 260 |
| Di Water | 4800 |

A 300 ml electrically heated continuous stirred tank reactor with an internal cooling coil was filled with 2-butoxyethanol and the temperature was adjusted to 210° C. Charge #1 from Table 3 above was fed to the reactor from a feed tank at 60 ml/minute. The reactor was kept volumetrically full at a pressure of 400-500 psi. The temperature was held constant at 210° C. The reactor output was drained to a waste vessel for the first thirty minutes and was then diverted to a 12 liter flask filled with charge #2 under agitation. The resultant copolymer had a weight averaged molecular weight 22,798 g/mol (measured by gel permeation chromatography using polystyrene standards), an acid value of 78 mgKOH/g resin solids (measured according to ASTM D1639 (1996)); and a solids content of 35.54% (weight percentage).

Example 2

An acrylic polymer dispersion was prepared as follows:

TABLE 2

| Ingredients | Parts by Weight |
|---|---|
| Charge #1 | |
| Polymer from Example 1 | 467.6 |
| Di Water | 740.7 |
| L-Ascorbic acid[1] | 1.9 |
| Charge #2 | |
| Styrene | 193.9 |
| Methyl methacrylate | 193.9 |
| Charge #3 | |
| Di Water | 44 |
| Luperox TBH70X[2] | 4.6 |

[1]purchased from Aldrich Inc.;
[2]commercially available from Arkema Inc.

Charge #1 in Table 2 was first charged into a four-necked round bottom 5 L flask fitted with a thermocouple, mechanical stirrer and condenser, and then heated up to 60° C. under N2 blanket. When the temperature reached 60° C., 10% by weight of charge #2 was added into the flask over 5 minutes, and then 20% of Charge #3 was added into the flask over 5 minutes, and then the mixture was held for 30 minutes. After 30 minutes' hold, the rest of Charge #2 and Charge #3 was fed into the flask over 1 hour. The reaction mixture was then held at 60° C. for 2 hours before being cooled to room temperature. The resultant dispersion had a solids content 34% and shell/core ratio 30/70 (mass ratio), and the Z average particle size was 40 nm (measured by Zetasizer).

Example 3

A grey basecoat (labeled 1A, Comparative) was prepared from the following mixture of ingredients:

TABLE 3

| Components | Parts by weight of Component |
| --- | --- |
| Polyurethane-acrylic dispersion[1] | 89.62 |
| acrylic latex[2] | 56.77 |
| Byk 348 surfactant[3] | 0.32 |
| Byk 032 defoamer[4] | 2.04 |
| Surfynol 104E[5] | 4.20 |
| 50% DMEA[6] | 1.00 |
| Mineral Spirits[7] | 3.05 |
| White Tint[8] | 115.02 |
| Black Tint[9] | 8.09 |
| Yellow Tine[10] | 9.06 |
| Urethane Diol[11] | 5.83 |
| Dowanol PnB[12] | 7.12 |
| 2-ethylhexanol[13] | 3.05 |
| 50% DMEA[6] | 1.87 |
| Byketol WS[14] | 9.19 |
| Resimene HM2608[15] | 16.91 |
| Cymel 1158[16] | 9.76 |
| Deionized Water | 27.21 |
| Total | 348.25 |

[1]polyurethane-acrylic dispersion made of 9.73 wt % adipic acid, 11.30 wt % isophthalic acid, 2.15 wt % maleic anhydride, 21.66 wt % 1,6-hexanediol, 5.95 wt % dimethylolpropionic acid, 1.0 wt % butanediol, 16.07 wt % isophorone diisocyanate, 26.65 wt % butyl acrylate, 2.74 wt % hydroxypropyl methacrylate and 2.74 wt % ethylene glycol dimethacrylate, with a solids content 45 wt % in deionized water.
[2]acrylic latex made of 2.519 wt % acrylamide in water (50%), 3.071 wt % 2-hydroxyethyl acrylate, 2.039 wt % hydroxyethyl methacrylate, 2.051 wt % ethylene glycol dimethacrylate, 2.959 wt % methacrylic acid, 59.711 wt % methyl methacrylate, 27.646 wt % n-butyl acrylate and 0.004 wt % acrylic acid, with a solids content 25 wt % in deionized water.
[3] & [4] & [14]additive available from Byk Chemie.
[5]surfactant commercially available from Air Products and Chemicals, Inc.
[6]Dimethyl ethanolamine 50% aqueous solution
[7]solvent available from Shell Chemical Co.
[8]White tint paste consisting of 61% TiO2 dispersed in 9% acrylic polymer blend having a solids content of 70%
[9]Black Tint paste consisting of 6% carbon black dispersed in 18% acrylic polymer and having a solids content of 24%
[10]yellow Tint paste consisting of 25% Mapico Yellow 1050A dispersed in 21% acrylic polymer and having a solids content of 46%
[11]polyurethane diol prepared by reacting 1 mole of Jeffamine D-400 (from Huntsman Chemical Co.) with 2 moles of ethylene carbonate at 130 C. See U.S. Pat. No. 7,288,595.
[12]Propylene glycol n-butyl ether available from Dow Chemical Co.
[13]Solvent available from Dow Chemical Co.
[15]available from Cytec.
[16] available from Allnex.

A grey basecoat labeled 1B was prepared from the following mixture of ingredients; the ingredients were exactly the same as in the comparative Grey basecoat 1A formula, but with the introduction of the acrylic dispersion from Example 2. Grey basecoat 1B is an illustration of a composition of the present invention.

TABLE 4

| Components | Parts by weight of Component |
| --- | --- |
| Polyurethane-acrylic dispersion | 76.65 |
| acrylic latex | 56.77 |
| Acrylic dispersion from Example 2 | 14.29 |
| Byk 348 surfactant | 0.32 |
| Byk 032 defoamer | 2.04 |
| Surfynol 104E | 4.20 |
| 50% DMEA | 1.00 |
| Mineral Spirits | 3.05 |
| White Tint | 115.02 |
| Black Tint | 8.09 |
| Yellow Tint | 9.06 |
| Urethane Diol | 5.83 |
| Resimene HM2608 | 16.91 |
| Cymel 1158 | 9.76 |
| Dowanol PnB | 7.12 |
| 2-ethylhexanol | 3.05 |
| 50% DMEA | 1.87 |
| Byketol WS | 9.19 |
| Deionized Water | 27.21 |
| Total | 348.25 |

Basecoats 1A and 1B were spray applied in an environment controlled to 81° F. (27° C.) and 65-70% relative humidity onto 4 inch by 12 inch (10 cm by 30 cm) steel panels that were coated with PPG Electrocoat (ED6280Z) commercially available from PPG. The substrate panels were obtained from ACT Test Panels, LLC of Hillsdale, Mich. The basecoat 1A or 1B was applied in one coat with a dry film thickness around 18-20 microns, and then flashed at ambient temperature for 16 minutes; then Summit White basecoat (SGMFB8624) commercially available from PPG was then applied over the basecoated panels in two coats with a split ratio 50/50 with a dry film thickness of 18-20 microns, and then flashed at ambient temperature for 5 minutes and then dehydrated at 80° C. for 5 minutes.

One component clearcoat commercially available from PPG as HTC2000SY was then applied over the basecoated panels in two coats with 70 seconds ambient flash between coats. The clearcoated panels were allowed to flash for 8 minutes at ambient conditions and baked for 4 minutes at 212 F (100° C.) and then 30 minutes at 285 F (140° C.). The dry film thickness of the clear coat was around 45-50 microns. Basecoat 1A or 1B was sprayed using Versabell II bell with serrated bell cup with 65 mm in diameter, 250 mm applying distance, 50 kV voltage charge with 600 mm/s tip speed. The Summit White basecoat (SGMFB8624) was sprayed two coats at 50/50 split ratio using Versabell II bell with non-serrated bell cup with 65 mm in diameter at 1000 mm/s tip speed. One component clear coat HTC2000SY was sprayed using Versabell II bell with serrated bell up with 65 mm in diameter at 950 mm/s tip speed.

The appearance data of the final films were measured by BYK Wavescan instrument (manufactured by BYK Gardner USA of Columbia, Md.) and shown in Table 5. From the data, by this wet-on-wet spray process, the addition of acrylic dispersion (made in Example 2) gave a smoother final films for vertical panels, and long wave and R rating were improved (the lower long wave and higher R rating, better appearance and smoother films). The horizontal panels had similar smoothness.

TABLE 5

| Basecoat | Panel orientation | Long Wave | R rating |
| --- | --- | --- | --- |
| 1A | Horizontal | 4.6 | 8.5 |
|  | Vertical | 12.4 | 6.4 |
| 1B | Horizontal | 5.3 | 8.3 |
|  | Vertical | 7.5 | 7.6 |

To understand the stratification effect of the acrylic dispersion (made in Example 2) in the basecoat during ambient flash, two mixtures were made based on the main organic polymers in Grey basecoat 1A and 1B formula (Table 6).

TABLE 6

| Components | Mixture (parts by weight of component) | |
| --- | --- | --- |
| | 1A | 1B |
| Polyurethane-acrylic dispersion | 89.60 | 76.65 |
| Acrylic latex | 56.57 | 56.89 |
| Resimene HM2608 | 26.40 | 26.50 |
| Acrylic dispersion in Example 4 | — | 14.00 |

Mixture 1A and 1B were drawn down on a bare steel panel, then dried at room temperature to form a film. Their adhesion profiles by atomic force microscopy (AFM) are shown in FIG. 1. In comparison, the acrylic dispersion made in Example 2 has a significantly higher Tg than the other components in the mixture. The mixture shown in FIG. 1B has more coverage with hard domains, which have lower adhesion. There is only around 6% by weight acrylic dispersion in the mixture, but over 70% coverage area with lower adhesion in FIG. 1B, which indicates the stratification of acrylic dispersion (made in Example 2) to the surface during ambient flash drying process. The accumulated acrylic dispersion particles on the surface enable the better flow/leveling of the second basecoat coming in, thus give a smoother final film and better appearance (lower long wave and higher R rating).

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A waterborne curable film-forming composition comprising:
   a) an aqueous dispersion of polymeric acrylic particles, wherein the particles have a Z average particle size less than 80 nm and have reactive functional groups; wherein the particles are prepared from a monomer mixture comprising ethylenically unsaturated monomers that are polymerized in the presence of a branched polymer having an acid value of 40-200, wherein the branched polymer is prepared from ethylenically unsaturated monomers;
   b) a crosslinking agent having functional groups reactive with functional groups on the polymeric acrylic particles; and
   c) an aqueous dispersion of at least one additional polymer having hydroxyl and/or acid functional groups and having a Z average particle size greater than 100 nm.

2. The waterborne curable film-forming composition according to claim 1, wherein the polymeric acrylic particles have free acid and/or hydroxyl functional groups.

3. The waterborne curable film-forming composition according to claim 1, wherein the branched polymer contains free ethylenically unsaturated functional groups that may react with monomers in the monomer mixture.

4. The waterborne curable film-forming composition according to claim 1, wherein the composition comprises less than 20 percent by weight of any polymeric component having a number average molecular weight less than 2000, excluding the crosslinking agent (b).

5. The waterborne curable film-forming composition according to claim 1, wherein the polymeric acrylic particles are present in the film-forming composition in an amount ranging from 2 weight percent to 25 weight percent, based on the total weight of the resin solids of the components which form the curable film-forming composition.

6. The waterborne curable film-forming composition according to claim 1, wherein the crosslinking agent comprises an at least partially alkylated aminoplast resin and/or a polyisocyanate.

7. The waterborne curable film-forming composition according to claim 6, wherein the crosslinking agent comprises an at least partially alkylated aminoplast resin and optionally an imino functional aminoplast comprising at least 15 mol percent imino functional groups, wherein the mass ratio of at least partially alkylated aminoplast resin to imino functional aminoplast is 100:0 to 10:90.

8. The waterborne curable film-forming composition according to claim 1, wherein the additional polymer c) comprises a polyurethane, polyester, polyether, polycarbonate, polyurea, polyolefin and/or acrylic polymer, and is present in the composition in an amount of 50 to 70 percent by weight, based on the total weight of resin solids in the curable film-forming composition.

9. The waterborne curable film-forming composition according to claim 1, wherein after application of the composition to a substrate and after dehydration to form a dehydrated coating, the dehydrated coating demonstrates a concentration of the polymeric acrylic particles within a surface region of the coating that is greater than a concentration of the polymeric acrylic particles within a bulk region of the coating.

10. A multilayer coated substrate comprising:
    A) a substrate;
    B) a primary composition applied directly to a surface of the substrate, forming a first coating;
    C) a first topcoat applied on top of the first coating; and
    D) a second topcoat that is different from the first topcoat applied on top of the first topcoat; wherein the primary composition B) comprises a waterborne curable film-forming composition, the waterborne curable film-forming composition comprising:
       a) an aqueous dispersion of polymeric acrylic particles, wherein the particles have a Z average particle size less than 80 nm and have reactive functional groups; wherein the particles are prepared from a monomer mixture comprising ethylenically unsaturated monomers that are polymerized in the presence of a branched polymer having an acid value of 60-100, wherein the branched polymer is prepared from ethylenically unsaturated monomers;
       b) a crosslinking agent having functional groups reactive with functional groups on the polymeric acrylic particles; and
       c) an aqueous dispersion of at least one additional polymer having hydroxyl and/or acid functional groups and having a Z average particle size greater than 100 nm.

11. The multilayer coated substrate according to claim 10, wherein the polymeric acrylic particles have free acid and/or hydroxyl functional groups.

12. The multilayer coated substrate according to claim 10, wherein the branched polymer contains free ethylenically unsaturated functional groups that may react with monomers in the monomer mixture.

13. The multilayer coated substrate according to claim 10, wherein the composition comprises less than 20 percent by weight of any polymeric component having a number average molecular weight less than 2000, excluding the crosslinking agent (b).

14. The multilayer coated substrate according to claim 10, wherein the polymeric acrylic particles are present in the film-forming composition in an amount ranging from 2 weight percent to 25 weight percent, based on the total weight of the resin solids of the components which form the curable film-forming composition.

15. The multilayer coated substrate according to claim 10, wherein the crosslinking agent comprises an at least partially alkylated aminoplast resin and optionally an imino functional aminoplast comprising at least 15 mol percent imino functional groups, wherein the mass ratio of at least partially alkylated aminoplast resin to imino functional aminoplast is 100:0 to 10:90.

16. The multilayer coated substrate according to claim 10, wherein the additional polymer c) comprises a polyurethane, polyester, polyether, polycarbonate, polyurea, polyolefin and/or acrylic polymer, and is present in the primary composition is an amount of 50 to 70 percent by weight, based on the total weight of resin solids in the curable film-forming composition.

17. The multilayer coated substrate according to claim 10, wherein upon application to a vertically oriented substrate having an initial $R_a$ value of 0.3 to 0.4 and upon curing of the primary composition, the first topcoat, and the second topcoat in a vertical orientation, the multilayer coated substrate demonstrates a longwave value of no more than 10.

18. A method for forming a composite coating on a substrate comprising:
   (A) applying a primary composition in the form of a waterborne curable film-forming composition to at least a portion of a surface of the substrate to form a substantially uncured primary coating thereon, the waterborne curable film-forming composition comprising:
      a) an aqueous dispersion of polymeric acrylic particles, wherein the particles have a Z average particle size less than 80 nm and have reactive functional groups; wherein the particles are prepared from a monomer mixture comprising ethylenically unsaturated monomers that are polymerized in the presence of a branched polymer having an acid value of 60-100, wherein the branched polymer is prepared from ethylenically unsaturated monomers;
      b) a crosslinking agent having functional groups reactive with functional groups on the polymeric acrylic particles; and
      c) an aqueous dispersion of at least one additional polymer having hydroxyl and/or acid functional groups and having a Z average particle size greater than 100 nm;
   (B) applying a first topcoat to at least a portion of the primary coating formed in step (A) prior to substantially curing the primary coating, to form a secondary coating thereon;
   (C) applying a second topcoat that is different from the first topcoat to at least a portion of the first topcoat applied in step (B) prior to substantially curing the secondary coating, to form a clear coating thereon; and
   (D) holding the substrate at a temperature of 80 to 160° C. for at least 15 minutes, sufficient to substantially cure the composite coating after the primary composition, the first topcoat, and the second topcoat have been applied to the substrate.

19. The method according to claim 18, wherein prior to applying the first topcoat to the primary coating, the primary coating is dehydrated.

20. The method according to claim 18, wherein the crosslinking agent comprises an at least partially alkylated aminoplast resin and/or a polyisocyanate.

21. The method according to claim 20, wherein the crosslinking agent comprises an at least partially alkylated aminoplast resin and optionally an imino functional aminoplast comprising at least 15 mol percent imino functional groups, wherein the mass ratio of at least partially alkylated aminoplast resin to imino functional aminoplast is 100:0 to 10:90.

22. The method according to claim 18, wherein upon application to a vertically oriented substrate having an initial $R_a$ value of 0.3 to 0.4 and upon curing of the primary composition, the first topcoat, and the second topcoat in a vertical orientation, the composite coating demonstrates a longwave value of no more than 10.

* * * * *